United States Patent
Li

(10) Patent No.: US 10,058,958 B2
(45) Date of Patent: Aug. 28, 2018

(54) METHOD FOR MANUFACTURING PLATE FOR CEMENT INDUSTRY TUBE MILL

(75) Inventor: Xiaoru Li, Hong Kong (CN)

(73) Assignee: HUAZHI ENERGY CONSERVATION (HK) CO., LIMITED, Hong Kong (CN)

( * ) Notice: Subject to any disclaimer, the term of this patent is extended or adjusted under 35 U.S.C. 154(b) by 460 days.

(21) Appl. No.: 13/816,463

(22) PCT Filed: Aug. 31, 2011

(86) PCT No.: PCT/CN2011/001476
§ 371 (c)(1),
(2), (4) Date: Jun. 10, 2013

(87) PCT Pub. No.: WO2012/027964
PCT Pub. Date: Mar. 8, 2012

(65) Prior Publication Data
US 2013/0247349 A1    Sep. 26, 2013

(30) Foreign Application Priority Data

Sep. 3, 2010  (CN) .......................... 2010 1 0271651

(51) Int. Cl.
*B02C 17/22*    (2006.01)
*B23P 6/00*    (2006.01)
(Continued)

(52) U.S. Cl.
CPC ................ *B23P 6/00* (2013.01); *B02C 17/22* (2013.01); *C04B 35/63452* (2013.01);
(Continued)

(58) Field of Classification Search
CPC . B02C 17/22; B23P 6/00; C04B 37/02; C04B 37/023–37/026; C04B 2237/40;
(Continued)

(56) References Cited

U.S. PATENT DOCUMENTS 4,569,648 A * 2/1986 Riederer .................... B01J 2/12
                                              159/11.2
5,055,336 A * 10/1991 Davis ................... B65G 11/166
                                              193/2 R
(Continued)

FOREIGN PATENT DOCUMENTS

| CN | 201462227 U | 5/2010 | |
|----|-------------|--------|---|
| CN | 101912804 A | 12/2010 | |
| DE | 19638696 A1 | 4/1998 | |
| IN | 41/KOL/2010 | * 5/2010 | ............ F27D 13/00 |
| JP | 2006097 A | 1/1990 | |

OTHER PUBLICATIONS

Xiang, Qiqi, Comparison of Manufacturing Methods of Vertical Miller and Grinding Roller and Abrasive Disc Lining Board and Selection Principles of Products, Foundry Technology, Dec. 2008, pp. 1754-1756.

*Primary Examiner* — Christopher Besler
(74) *Attorney, Agent, or Firm* — Muncy, Geissler, Olds & Lowe, P.C.

(57) ABSTRACT

A manufacture method of a lining plate structure for use with a tube mill for the cement industry. The manufacture method has the following three technical solutions: 1) metal lining plate, 2) ceramic lining plate, and 3) combined lining plate. The manufacture method includes: lining the concave-convex space, formed in the combination of metal lining plate and tube body, with corundum ceramic lining plate; then installing the combined lining plate on the steel plate of the tube body through inlaying, sticking and local welding. Under the same reference conditions of the present method, the weight of lining plate is reduced 50%, saving the steel material consumption by more than 50%; and the service life of the lining plate for use with the tube mill of cement industry is doubled, up to 15000-20000 hours.

7 Claims, 2 Drawing Sheets

(51) Int. Cl.
*C04B 35/634* (2006.01)
*C04B 37/02* (2006.01)

(52) U.S. Cl.
CPC .......... *C04B 37/025* (2013.01); *C04B 37/028* (2013.01); *C04B 2237/062* (2013.01); *C04B 2237/343* (2013.01); *C04B 2237/406* (2013.01); *C04B 2237/84* (2013.01); *C04B 2237/86* (2013.01); *Y02P 40/20* (2015.11); *Y02P 40/63* (2015.11); *Y10T 29/49732* (2015.01)

(58) Field of Classification Search
CPC .......... C04B 2237/406; C04B 2237/84; C04B 2237/86; C04B 2237/88; Y10T 29/49732; Y10T 29/49742; Y10T 29/49428; Y10T 29/4943
USPC ................. 241/241, 182, 183, 300
See application file for complete search history.

(56) References Cited

U.S. PATENT DOCUMENTS

| | | | |
|---|---|---|---|
| 5,061,665 A * | 10/1991 | Seki .................... | C09K 3/1427 423/608 |
| 7,240,821 B2 * | 7/2007 | Talwar ................. | B23K 20/122 156/73.5 |
| 7,837,020 B2 * | 11/2010 | Pittman ................ | B65G 11/166 193/2 R |
| 2003/0168496 A1 * | 9/2003 | Shinkai et al. ........ | 228/180.21 |
| 2004/0144874 A1 * | 7/2004 | Moskowitz ............ | B02C 17/22 241/30 |
| 2008/0135659 A1 * | 6/2008 | Condon ................ | B02C 13/1814 241/274 |
| 2008/0265074 A1 * | 10/2008 | Melo .................... | B02C 17/22 241/299 |
| 2009/0163346 A1 * | 6/2009 | Cohen .................. | C04B 35/119 501/134 |
| 2009/0320953 A1 * | 12/2009 | Fletcher et al. ........ | 138/148 |
| 2013/0038003 A1 * | 2/2013 | Roy ..................... | B01F 9/025 266/200 |

* cited by examiner

METHOD FOR MANUFACTURING PLATE FOR CEMENT INDUSTRY TUBE MILL

TECHNICAL FIELD

The present invention belongs to the machinery field, relating to an industrial tube mill, in particularly a novel lining plate structure for use with tube mill of cement industry and the manufacture method thereof.

BACKGROUND ART

The operating conditions of existing lining plate for use with tube mill of cement industry is middle and low pressure, and middle and low impact force. The failure frequency of reciprocation force is less than 10 to the power of 7, belonging to low cycle fatigue. The wear type is abrading-type abrasive wear with middle and low stress. This kind of operating condition is collectively called "Small Energy & Repeated Impact" condition.

So far, the lining plates for use with tube mill of cement industry home and abroad are wear-resistant cast steel lining plates manufactured with such steelmaking equipments as electric arc furnace and main frequency furnace, through the steps of ingredient preparation and smelting as well as making sand mold or metal mold for the lining plates, then the steps of casting, removing from mold and heat treatment. Its mechanical and physical performance index is as follows: the Rockwell Hardness HRC is about 55-60, the impact value $\alpha$ is 4~8 J/cm$^2$, and the metallurgical structure is a Martensite, such as a carbide. The submicroscopic pattern of the carbide is a continuous network pattern, functioning as microcracks for damage within the steel materials. The mechanical and physical performances can be greatly improved only under the condition that cracks occur to the network carbide. This is also a long-term goal to strive for scientific and technical workers, but so far with little success. This is one of the key problems of technologies resulting in a short service life of wear-resistant steel material.

As a result, existing tubes mill of cement industry all use large thickness of lining plates, to ensure an ideal maintenance cycle and an appropriate service life.

For example, the lining plate thickness of tube mill is generally more than 65 mm, and the total weight of lining device is up to 105 T. With a large thickness and a great weight, the fixing of milling tube body can be achieved only by bolt connections, thus the total drilling holes of the tube body can be up to 1632, seriously weakening the stiffness and strength of the tube body. Depending on the demands of economical maintenance cycle (service life), the thickness of lining plate is about 65 mm, where the size of each lining plate is approximately 250×350×60 mm, so the weight of each lining plate is about 44 kg. In such conditions, proposals of fixing with other ways are suggested, for example, a test has been performed in 1960s, where a fixing method for inlaying and sticking by use of adhesives is used. However, a slight mistake in installing may lead to a collapse, thereby causing serious human injuries, or a collapse of lining plate in the milling tube when operating will result in serious facility accidents.

It cannot realize a weight reduction by decreasing the size, unless the thickness of lining plate is reduced. Along with the upsizing of tube mill, the size of lining plate is increasing, even more unsuitable for sticking with adhesive.

A major breakthrough has never happen to the service life of wear-resistant cast steel lining plate of tube mill, always within 7000-10000 hours. The total amount of lining plates for use with tube mills of cement industry in Chinese mainland is up to more than 300,000 tons. Therefore, significantly extending the service life of lining plate and thus saving steel consumption has a great economic significance both for energy conservation and environmental protection.

Thus, to reduce the thickness and weight of lining plate, increase the filling amount of grinding body, and greatly the production of mill tube; to renovate the fixing way of lining plate, realize that the tube body has no or few drilling holes thus enhancing the rigidity and strength of tube body; and to guarantee the reliable operation of equipment and so on, are the achievements that scientific and technological works have always dream, but with little success even to this day.

Along with the development of grinding technology, it can significantly save energy by use of pre-grinding technology in 1980s, which was gradually familiar to people. In existing cement industry, it is a general trend to gradually install such pre-grinding equipments as extruding press, vertical mill and short mill to the tube mill. In this way, the granularity of grinding materials has been lowered from 25-30 mm to less than 1 mm, even gradually to 150-200 m$^2$/kg of specific surface. Therefore, fundamental changes have occurred to the grinding mechanical property of tube mill. In one word, the impact force of the lining plate received in the tube mill is significantly decreased.

Consequently, the requirements on the material of lining plate of tube mill are no longer limited to followings: in order to withstand the impact force without cracking, both a good impact ductility a value (20-30 J/cm$^2$) and a certain cross section are needed, and the cross section is the thickness of lining plate.

The impact value $\alpha$ and Rockwell Hardness HRC of the wear-resistance steel material cannot be achieved at the same time. To increase the impact value $\alpha$, the Rockwell Hardness HRC must be sacrificed; conversely, to improve the Rockwell Hardness HRC, the impact value $\alpha$ must be lowered. When the impact value $\alpha$ 20~30 J/cm$^2$, the Rockwell Hardness HRC can be 40-45 at most, thus it must have a lining plate thick enough to meet the need of economic maintenance cycle (service life).

With the pre-grinding process, the tube mill performs grinding mainly by the grinding function. It is better to have a higher Rockwell Hardness HRC (preferably 55-60) so as to withstand grinding wear and realize an enough service life, as long as the material of lining plate has an appropriate impact value $\alpha$ (20~30 J/cm$^2$). HRC can be improved only with low $\alpha$ value. In fact, the development of existing lining plate technology is greatly lagging behind, and it provides the present invention with space and opportunities for development.

SUMMARY OF THE INVENTION

In order to improve the mechanical and physical performances of lining plate for use with tube mill, the present invention provides a novel industrial tube mill, with a weight greatly lower than that of existing tube mill.

The manufacture method of the novel lining plate has following three technical solutions:

1) Metal Lining Plate

The metal lining plate of tube mill is manufactured by following steps: cold and hot die stamping medium- and low-carbon steel to mold a lining substrate with desired geometry, then performing surfacing welding to the surface of lining substrate, forming a surfacing layer, and thus manufacturing the lining plate of tube mill. The lining plate is installed in the tube body through procedures as below: using high-strength cement mortar, epoxy resin, or various inorganic adhesives as cured substances, inlaying and sticking the lining plate, and connecting it to the inner steel plate of tube body by means of local welding.

2) Ceramic Lining Plate

Ceramic lining plate includes two types:

A. With existing production technology and equipment of ceramic factory, we only need to provide the sizes of various bars, sheets, blocks and plates required, and the drawings of surface geometry, then the ceramic factory reopen the mold according to the drawings, to produce the ceramic lining plate we desire.

B. The materials of the ceramic lining plate is prepared based on the compositions of corundum ceramics, and is then molded with a press by use of a metal mold. It is sent to a high temperature furnace to be roasted, and is cooled after roasting, thus the ceramic lining plate for use with tube mill of cement industry is produced, where the size thereof can be determined depending on the specifications of tube mills.

Abovementioned cured substances can be used in installing and fixing the two lining plates in the tube body by means of inlaying and sticking, and a way of local welding is used for connecting the steel plate in the tube body. Constructions are still convenient. The tube body of tube mill can be free of or provided with few drilling holes.

3) Combined Lining Plate

Different shapes of bars, sheets and blocks are lined in the concave-convex space formed in the combination of metal lining plate and tube body, so as to form a combined lining plate. The service life of the new combined lining plate can be further enhanced and extended, and this improvement cannot be achieved by any form of existing lining plates. The new combined lining plate of this invention is then inlayed and stuck by use of the cured substances, and is installed on the steel plates of the tube body by means of local welding.

Benefits of the present invention are as follows:

1. Under the same reference conditions, the weight of lining plate for use with the tube mill of cement industry is reduced 50%.

2. Under the same reference conditions, the service life of lining plate for use with the tube mill of cement industry is doubled, up to 15000-20000 hours.

3. Under the same reference conditions, the steel material consumption of lining plate for use with the tube mill of cement industry is saved more than 50%, totally saving over 100,000 tons of steel materials for Chinese mainland cement industry.

4. Existing connection way of the lining plate for use with tube mill is changed, from bolt connection to inlaying, sticking and local welding, so that the tube body is free of or has few drilling holes.

5. With an extremely superior performance (Rockwell Hardness up to 85-90) and good fabrication properties, the wear-resistant ceramic can be directly molded and then roasted to form lining plate of tube mill providing the materials are prepared. It creates a new technology route of "Replace Steel with Ceramics". For fabrication of lining plate for use with tube mill of cement industry, important breakthroughs will be made both on the saving of steel materials and the service life extension of tube mill.

Symbols in figures: 1. Surfacing Layer; 2. Lining Plate Substrate; 3. Ceramic Lining Plate; 4. Steel Plate of Tube body; 5 Cured Substance.

MODE OF CARRYING OUT THE INVENTION

The present invention provides a new industrial tube mill, and the novel manufacture method of its lining plate and application thereof includes following three technical solutions:

1) Combined Lining Plate of Tube Mill Both Rigid and Flexible

Figure 1:
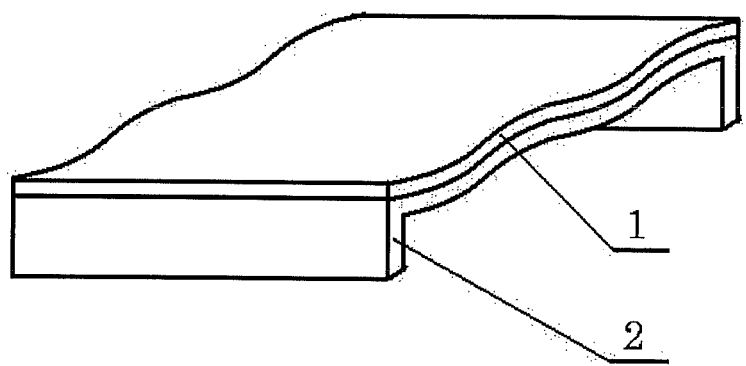
FIG. 1 is a structural representation of metal lining plate.

Please refer to FIG. 1, the present invention uses normal medium- and low-carbon steel plate $\delta$=10-12 mm as material, including following steps: cold and hot die stamping medium- and low-carbon steel plate to mold a lining substrate 2 with desired geometry, then performing surfacing welding to the surface of lining substrate 2, forming a 5-15 mm metal or metal and non-metal composite surfacing layer 1. The surfacing material can be TN-65 or TM-65 made in China, UM10-65-G or MF10-GF-60-G welds made in German, or high-hardness surfacing electrodes made in Belgian. The hardness HRC of surfacing layer 1 can be up to 70-80, and the impact value $\alpha$ still meets the requirement of 4~6 J/cm$^2$. The new combined lining plate of tube mill manufactured by this method is soft inside and rigid outside, both having firmness and flexibility, thus it is an ideal combination and match, as well as an ideal lining plate for tube mill of cement industry with an enhanced grinding function.

With a reduced thickness, the weight of 10×10 cm=100 cm$^2$ area of tube body surface is decreased from 5.07 kg to 2.1 kg, by 2.4 times. Therefore, the lining plate manufactured in the present invention can be installed on the steel plate 4 of tube body by way of inlaying, sticking and local welding. The cured substance 5 can be high-strength cement mortar, epoxy resin or inorganic adhesives, etc.; the high-strength cement mortar (ratio of 525# cement and fine sand is 1:1.5-2, and the three-day rupture strength can be over 5.5 kg/cm$^2$), epoxy resin E03 and E06 with a uneven pull-off strength of 30 kg/cm$^2$, and various inorganic adhesives are used in inlaying, sticking and local welding, very simple and convenient for construction. Meanwhile, it saves the need of drilling holes for tube body in bolt connection.

2) Non-Metal Ceramic Lining Plate of Tube Mill

The manufacture of the ceramic lining plate 3 includes two ways:

The first way is to make full use of the production technology and equipment of existing ceramic factories (such as MIXING Ceramics), we only need to provide the sizes of various bars, sheets, blocks and plates required, and the drawings of surface geometry, then the ceramic factory reopen the mold according to the drawings, to produce the ceramic lining plate 3 we desire.

The second way is to prepare the materials based on the compositions of corundum ceramics, belonging to existing technology, and it is then molded with a 1500-2000 T press by use of a metal mold. After that, it is sent directly to a high temperature furnace to be roasted at 1600-1800° C., and is cooled after 1 hour of roasting, thus the ceramic lining plate 3 for use with tube mill of cement industry is produced, where the size thereof can be determined depending on the specifications of tube mills, the thickness can be controlled within 30 mm, the dimension can also be 100×100×30 mm, 200×200×30 mm, 300×300×30 mm, and the geometric surface is made depending on the corrugated dimension we determine.

The impact value α of corundum ceramics is not less than 10 J/cm², and corundum ceramics has a unique hardness any kind of wear-resistant steel material cannot reach, the hardness value HRC being up to 85-95, even the hardness of sharp steel is only within 75-80.

The chemical compositions of corundum ceramic lining plate we use are as follows (weight ratio):
Alpha-alumina powder: 85%-95%
Zirconia powder: 5%-15%
With following properties:
Compression strength: 700-900 kg/cm²
Specific Weight: 3.7-3.9
Hardness HRC: 85-95
Impact value α: >10 J/cm²

Figure 2:
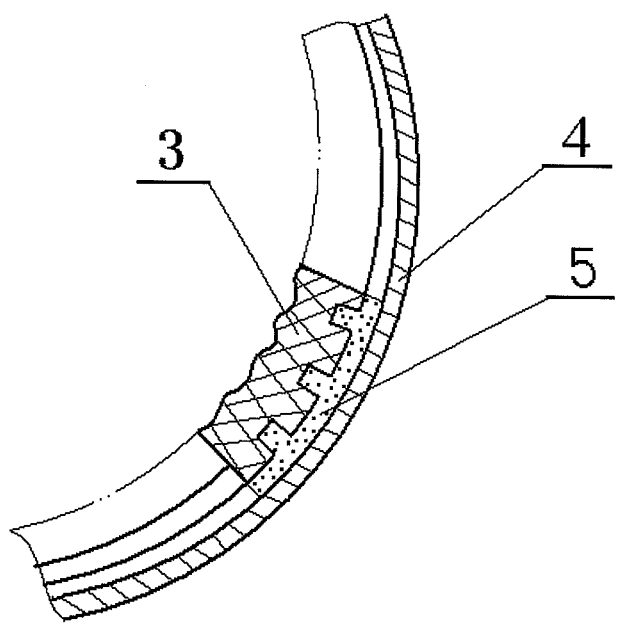
FIG. 2 is a representation of non-metal lining plate applied to tube mill.

The specific weight of corundum ceramics lining plate 3 is small, only ½ of 7.9, namely that of cast ling plate, thus the weight of 10×10 cm=100 cm² area of tube body surface is decreased from 5.07 kg to 1.17 kg, by 4.3 times. It is truly be thin-wall, light-weight and high-performance. Please refer to FIG. 2, the installation on the steel plate 4 of the tube body can be done with abovementioned cured substances 5 by way of inlaying, sticking and local welding. It is very convenient for construction, and the tube body can be free of or have few drilling holes.

3) New Method of Extending the Service Life of Novel Surfacing Lining Plate

Figure 3:
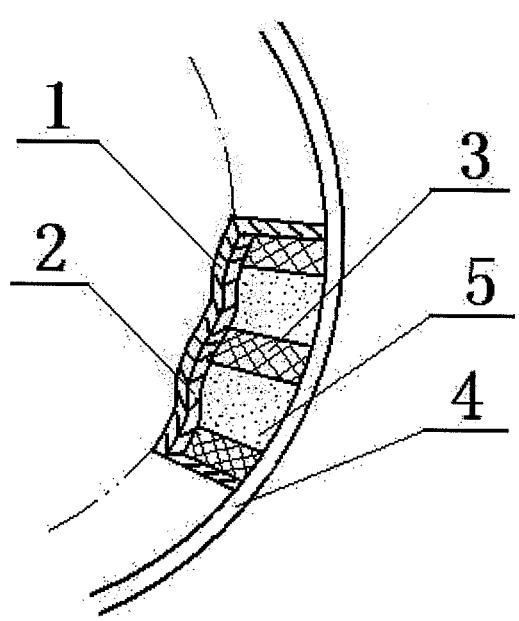
FIG. 3 is a representation of combined lining plate applied to tube mill.

Please refer to FIG. 3, when the novel surfacing lining plate manufactured in the present invention is installed on the steel plate 4 of the tube body with the cured substances 5 by way of inlaying, sticking and local welding, the corundum ceramic lining plates 3 having different shapes of bars, sheets and blocks can be particularly lined in the concave-convex space formed in the combination of the surfacing lining plate and the steel plate 4 of the tube body, and the preferred is corundum ceramic lining plates 3, which is a wear-resistant non-metal material with a hardness up to 85-95. The tube mill can operate normally for quite some time even when the surfacing lining plate is completely worn, thus the service life of novel surfacing lining plate can be further enhanced and extended, and this improvement cannot be achieved by any form of existing lining plates.

Related descriptions of the present invention:

1) Differences Between Existing Lining Plate and Present Invention:

So far, the lining plates for use with the tube mill of cement industry home and abroad are manufactured with steelmaking equipments, through the steps of ingredient preparation and smelting as well as making sand mold or metal mold for the lining plates, then the steps of casting, removing from mold and heat treatment, having essential differences with the stamping molding and surfacing processes of the present invention, and further differences and discrepancies with that of the wear-resistant non-metal ceramic lining plate of the present invention.

2) Important Technical Features of the Present Invention

Existing cast lining plates are restricted by smelting and heat treatment, and more importantly suffer a mutual constraint from the hardness HRC and the impact value α of materials. Therefore, it is quite difficult to increase the hardness HRC of cast lining plate from 60. The only solution is to increase the casting thickness to cover the shortage, thus ensuring the service life.

The present invention broke the restraints of steel material properties, realizing the feature of soft inside and rigid outside, and the surfacing hardness is up to 70-80; in order to be wear-resistant and extend service life, the first is to increase the hardness of materials. The corundum ceramic has a better performance; therefore, the thickness half reduction and the service life doubling of the lining plate of the present invention is a minimum requirement.

3) Installation Difference of Existing Casting Lining Plate and Present Invention:

Existing casting lining plate is heavy, in particular when tube mill is upsizing, it is heavier. In order to prevent the occurrence of major accidents, the installation in the tube body can be realized only by drilling holes on the tube body and bolting, and the drilling holes on the tube body are over 1600, seriously weakening the stiffness and strength of the tube body.

However, for the surfacing lining plate and ceramic lining plate of the present invention, the weights per unit area of the tube bodies are respectively reduced by 2.4 times and 4.3 times, thus the way of inlaying, sticking and local welding is absolutely available, truly realizing no or few drilling holes.

4) The service life extension measures, taken on existing casting lining plate home and abroad, are ineffective. When the remaining thickness of lining plate closes to ⅓ of the original thickness during the grinding of tube mill, the only choice is to remove and replace it completely, without any other alternative. This is not comparable to the present invention.

5) Following table gives a comparison of different lining plates with the same specifications of Φ 3.8×13 m, to show the economical efficiencies of them:

| Name | Unit (10 thousand Yuan/ton) | Installation weight of complete mill (ton) | Total price (10 thousand Yuan) | Service life (hour) |
| --- | --- | --- | --- | --- |
| Casting plate lining | 1.5 | 105 | 157.5 | 7000~10000 |
| Novel surfacing lining plate | 3.5 | 50 | 175 | 15000~20000 |
| Corundum ceramics lining plate | 3.0 | 50 | 150 | Expected >50000 |

The overall installed weights are different due to different thicknesses and specific weights, the investment differences are not significant, but the service life differences are huge.

Effects the present invention can achieve are as follows:

1. The manufacture of the lining plate of tube mill is changed from hot working to cold working, that is, from casting to stamping molding and then surfacing, thereby simplifying the manufacture method, and improving the production conditions of hot working, namely, hard, dirty, tiring and intensive labors needful conditions. It can realize automated operation.

2. The surfacing layer has an excellent mechanical and physical performance, thus the high-hardness surface and high-toughness substrate can reach an optimal match when working under a "Small Energy & Repeated Impact" condition, and the service life can be doubled on the basis of existing 7000-10000 hours, up to 15000-20000 hours.

3. The materials of the lining plate of the present invention are excellent, thus the thickness can be reduced 50%; for example, the thickness of Φ 3.8×13 m mill can be reduced from 65 mm to 30-35 mm, and the weight can be decreased for more than 50 tons, thereby saving steel material for more than 50% and the power consumption for about 300 Kw. The effects of ceramic lining plate are further better than these data.

4. The weight of lining plate is decreased and power consumption is saved, then the load of grinding medium can be increased for 24 tons, improving the production of mill for 10%-15%.

5. With the lightened lining plate, the fixing way of bolt connection can be eliminated absolutely; instead, a new way of cement inlaying, sticking and local welding is used, which can realize no or few drilling holes, thereby eliminating the loss of rigidity and strength of the tube body, improving the operating reliability of equipment, and avoiding 20%-30% loss of rigidity and strength of the tube body.

6. The installation of lining plate only requires the steps of inlaying, sticking and local welding, greatly reducing the original workload, as well as the labor intensity.

7. Popularization and application of the corundum ceramic lining plate to cement industry is a revolutionary means, with important breakthroughs on various economic indicators. The time of "Ten years free of replacement" has come to the lining plate of tube mill. The savings of steel are very impressive. With the technology of "Replace Steel with Ceramics", both the environmental significance and the economic significance are immeasurable, in particular nowadays when global prices of iron ores are continuing to soar.

What is claimed is:

1. A method for manufacturing and applying a lining plate structure to a concrete tube mill, comprising:
   providing a steel plate of a predetermined geometry;
   welding a surfacing layer on a side of the steel plate to form a lining plate;
   providing a plurality of ceramic lining plates of a predetermined geometry;
   attaching the plurality of the ceramic lining plates to an inner surface of a tube body in the concrete tube mill, wherein each of the ceramic lining plates is inlaid with adhesive such that all space between each of the ceramic lining plates is filled with adhesive, and wherein each of the lining plates covers a radial portion of the inner surface of the tube body in the concrete tube mill,
   attaching the lining plate onto a surface of the inlaid ceramic plates such that the lining plate structure covers a portion of the inner surface of the tube body in the concrete tube mill, wherein two ends of the steel plate are each positioned along two sides of one of the ceramic plates;
   wherein the ceramic lining plate is composed of corundum ceramic,
   wherein the ceramic lining plate is formed by molding with a press a mixture of 85-95% alumina powder and 5-15% zirconia powder and then roasting the molded mixture, and
   wherein the ceramic lining plate has a thickness of 30 mm, a specific weight of 3.7-3.9, an impact value greater than 10 J/cm2 and a hardness value (HRC) of up to 85-95.

2. A method for manufacturing a lining plate structure for application in a concrete tube mill, comprising:
   providing a steel plate of a predetermined geometry;
   welding a surfacing layer on a side of the steel plate to form a lining plate;
   providing a plurality of ceramic plates;
   inlaying the ceramic plates with adhesive on an inner surface of a tube body in the concrete tube mill, providing gaps between the ceramic plates that are filled with adhesive; and
   attaching the lining plate onto a surface of the inlaid ceramic plates such that the lining plate structure covers a portion of the inner surface of the tube body in the concrete tube mill, wherein two ends of the steel plate are each positioned along two sides of one of the ceramic plates.

3. The method of claim 2, wherein a portion of the steel plate is also inlaid with adhesive.

4. The method of claim 2, wherein the lining plate is attached such that the surfacing layer is exposed to an inside of the tube body of the concrete tube mill.

5. The method of claim 2, wherein the steel plate is formed by cold or hot die stamping.

6. The method of claim 2, wherein the tube body in the concrete tube mill forms a milling portion of concrete tube mill.

7. The method of claim 1, wherein a surface of the ceramic lining plate has recesses which are filled with the adhesive.

* * * * *